United States Patent [19]

Rogers

[11] 4,050,663
[45] Sept. 27, 1977

[54] MOUNTING BRACKET

[75] Inventor: George Alvin Rogers, Yorba Linda, Calif.

[73] Assignee: Modesett Engineering & Mfg., Yorba Linda, Calif.

[21] Appl. No.: 664,158

[22] Filed: Mar. 5, 1976

[51] Int. Cl.² ............................................. A47F 5/00
[52] U.S. Cl. .................................. 248/316 A; 248/203
[58] Field of Search .......... 248/316 R, 316 A, 316 C, 248/309, 310, 203, 226 B, 299; 24/263 R, 263 LL, 263 SW, 263 SB

[56] References Cited

U.S. PATENT DOCUMENTS

| 1,522,079 | 1/1925 | Read | 248/299 |
|---|---|---|---|
| 1,644,665 | 10/1927 | Beck | 248/310 |
| 2,501,176 | 3/1950 | Jacobs | 248/316 A |
| 2,566,656 | 9/1951 | David | 248/310 |
| 2,911,700 | 11/1959 | Wieland | 248/310 |
| 3,029,465 | 4/1962 | Graber et al. | 248/316 R |
| 3,433,446 | 3/1969 | Meder | 248/316 A |

FOREIGN PATENT DOCUMENTS 1,135,711  12/1956  France .................... 248/309

Primary Examiner—Robert A. Hafer
Attorney, Agent, or Firm—Fulwider, Patton, Rieber, Lee & Utecht

[57] ABSTRACT

There is disclosed a universal mounting bracket for the removable attachment of a radio and the like to a support structure such as the dash or interior wall surfaces of a vehicle. The bracket comprises a base member with tab supports to secure the base member to a supporting structure. The base member bears a longitudinal, coextensive lip along one edge and bears a plate member slidably carried thereon. The plate member bears a second lip parallel to and coextensive with the first lip. The bracket also includes a resilient spring biasing the plate member towards the lip of the base member whereby the mounting bar of a radio can be resiliently restrained between the opposed lips of the bracket. The bracket is assembled by fasteners which permit the fixed adjustability of the spacing between the opposed lips whereby the bracket can be adapted to fit a multitude of radio units of varied dimensions.

9 Claims, 5 Drawing Figures

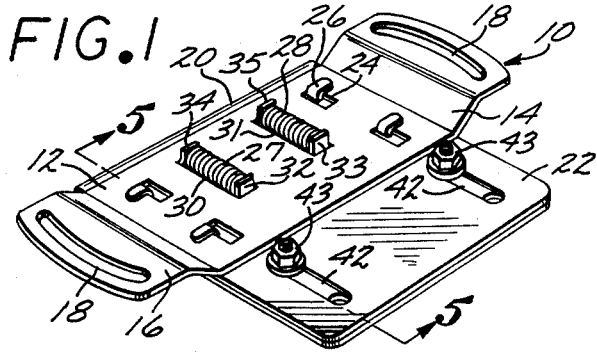
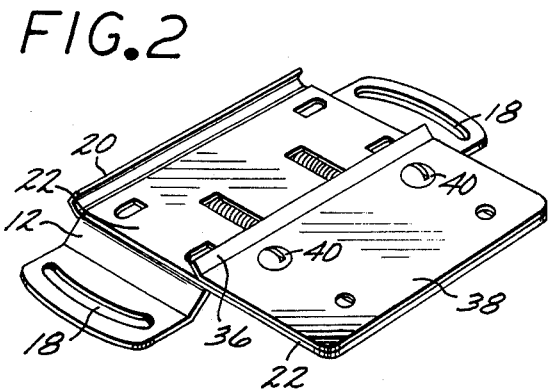
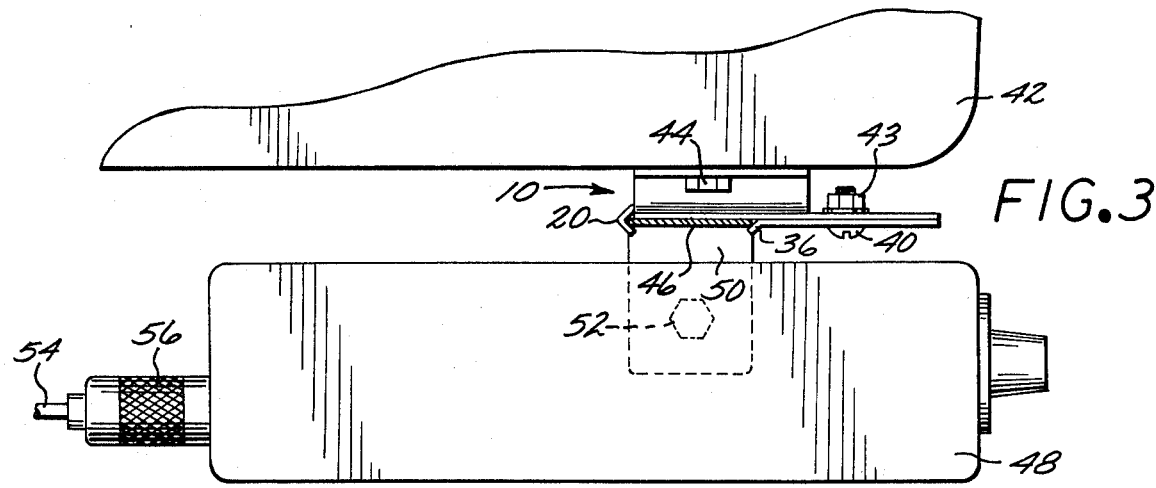
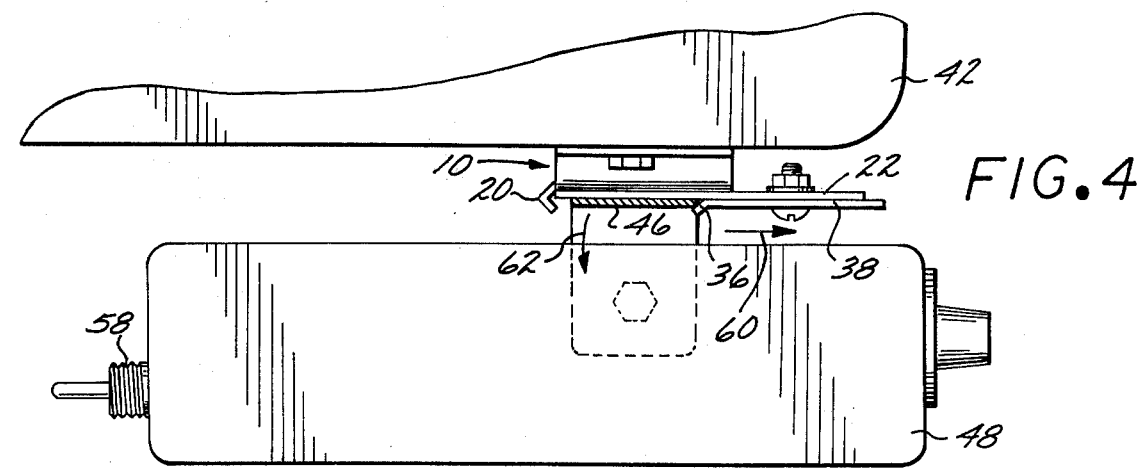
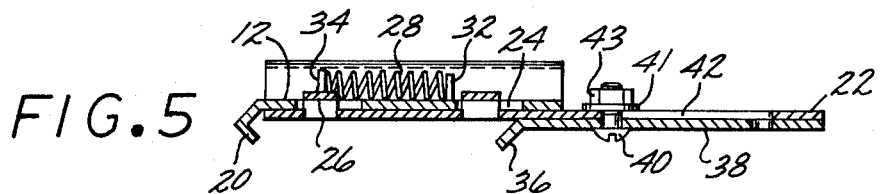

MOUNTING BRACKET

BACKGROUND OF THE INVENTION

1. Field of the Invention

This invention relates to a mounting bracket and, in particular, to a bracket ideally suited for the removable mounting of a ratio to a supporting structure such as a vehicle.

2. Brief Statement of the Prior Art

Citizen band radios such as transceivers, transmitters, receivers and the like are finding increasing popularity in vehicles and the like. Typically, the aforedescribed radios are secured to a supporting structure such as the undersurface of the dash of an automobile, truck, etc., by a flat yoke formed by a bar coextensive with the length of the radio and supported in a spaced-apart position above the radio cabinet by opposite legs which are attached to radio cabinet sides by removable fasteners.

Typically, the flat bar bears a plurality of apertures through which are extended fasteners such as screws, bolts and the like, to secure the bar and its dependent radio to the supporting structure. A difficulty experienced with the aforedescribed mounting bracket is that the ratio can be readily detached from its mounting bracket by removal of the fasteners securing the legs of the yoke bracket to the sides of the radio unit. This structure encourages pilferage of the expensive radio units and a more suitable means for carrying radio units in vehicles is desired.

The difficulty experienced with the aforedescribed mounting bracket is that the bracket is sufficiently difficult to remove that it prevents facile removal by the driver of the vehicle and, accordingly, the vehicles are frequently parked, temporarily, with the radio units accessible to vandals and thieves. It is, therefore, desirable to provide a mounting bracket which permits the facile, removable attachment of the radio and the like to a vehicle, encouraging the driver of the vehicle to remove the radio unit from the vehicle whenever the vehicle is left unattended, thereby preventing pilferage and vandalism. Preferably, the mounting bracket is universally adaptable for the mounting of various radios having mounting brackets of widely varied dimensions.

BRIEF STATEMENT OF THE INVENTION

This invention comprises a universal mounting bracket for removable attachment of a radio and the like to a supporting structure such as the dash of a motor vehicle. The mounting bracket comprises a base member having tab support means dependent thereon with apertures for receiving fasteners to secure said base member to the supporting structure. The base member also bears first lip means coextensive with one edge thereof and slidably supports a plate member which is movable in a direction normal to the first plate means. The plate member bears second plate means that is parallel to and coextensive with the first lip means. Resilient means are provided, such as a compression spring, biased between opposed retainer tab means of the base and plate members whereby the first and second lip means are resiliently biased towards each other, thereby providing means for the resilient restraint of the mounting bars of radios therebetween.

BRIEF DESCRIPTION OF THE DRAWINGS

The invention will be described in greater detail with reference to the presently preferred and illustrated embodiment thereof, of which:

FIG. 1 is a perspective view of one side of the mounting bracket;

FIG. 2 is a perspective view of the opposite side of the mounting bracket;

FIGS. 3 and 4 illustrate the mounting bracket supporting a radio; and

FIG. 5 is a sectional elevational view of the mounting bracket.

DESCRIPTION OF THE PREFERRED EMBODIMENT

Referring now to FIG. 1, the invention is shown as a universal mounting bracket, generally indicated at 10, which comprises a base member 12 having, at opposite ends thereof, tab support means 14 and 16 that project upwardly, out of the plane of base member 12. Each tab support bears apertures such as slot 18 to receive fasteners such as screws, bolts, and the like for securing the base member 12 to a supporting structure such a frame member or interior panel or surface of a vehicle. In the preferred embodiment, slots 18 are arcuate and are on the same radius, thereby permitting angular adjustability of the base member to the supporting structure.

The base member also bears first lip means 20, longitudinally coextensive therewith, which extends along one edge of the base member. The lip means 20 projects out of the plane of the base member 12 in a direction opposite that of the upward projection of tabs 14 and 16.

The base member carriers a plate member 22 that is slidably secured thereon and movable in a direction normal to the longitudinal lip means 20. Suitable attachment means such as a plurality of slots 24 with cooperative bent tab means 26 are provided, one each associated with respective base and plate members whereby the plate member is slidably secured to the base member.

Resilient means in the form of a pair of compression coil spring 27 and 28 are also provided. The springs are mounted in transverse slots 30 and 31 in the base member. The base member bears upright tabs 32 and 33 which served as spring retainers while the plate member 22 bears cooperative tabs 34 and 35 which project through the slots and serve as the retainers for the opposite end of springs 27 and 28 whereby plate 22 is resiliently biased towards the longitudinal lip 20.

Referring now to FIG. 2, the opposite side of the mounting bracket is shown. As there illustrated, longitudinal lip 20 extends upwardly from the plane of the base member 12. The plate member 22 can be seen to carry second lip means 36 which is parallel to and coextensive with first lip means 20.

In the preferred embodiment, second lip means 36 is a bent edge projection of lock plate 38 which is secured to plate member 22 by fasteners such as bolts 40. As shown in FIG. 1, the bolts 40 extend through slots 42 of the plate member 22 whereby the position of lock plate 38 on plate member 22 can be fixedly adjusted. In this manner, the spaced-apart position of the first lip means 20 and second lip means 36 can be fixedly adjusted to accommodate for mounting bars of varied widths.

Referring now to FIGS. 3 and 4, the employment of the mounting bracket for the removable attachment of a radio and the like to a supporting structure will be described. As shown in FIGS. 3 and 4, the supporting structure 42 can be a frame or interior panel member of a vehicle, typically the undersurface of a dash plate. The bracket 10 of the invention is secured to the support means by suitable fasteners such as screws, bolts and the like, generally indicated at 44. The resiliently biased and opposed first lip means 20 and second lip means 36 are shown in restraint of bar 46 of a generally yoke-shaped mounting bracket that is typically supplied with radios. The radio 38 is supported by legs 50 of the yoke-shaped bracket which are downwardly dependent at each end thereof and which are secured to opposite sides of the radio 48 by screw fasteners such as 52. In the typical radio, the lead 54 from the antenna carried on the vehicle is secured by a locking connector 56 that fits a receptacle jack of the radio.

The present invention provides for the facile and rapid detachment and attachment of the radio unit 48 to the supporting structure 42. This is achieved by disconnecting locking receptacle 56 and removal of the antenna plug 56, and removal of the plug from jack 58 of the radio. The radio is thereupon removable by urging the radio along the direction generally indicated by arrow 60, comprising resilient spring 28 and urging the plate assembly of lock plate 38 and plate member 22 away from lip means 20 to increase the spacing between lip means 20 and 36. This permits bar 46 to be removed by a downward movement along the direction generally indicated by arrow 62. In a similar and reverse fashion, the radio can be readily reinstalled by positioning the edge of bar 46 against the second lip means 36, urging of the plate assembly of lock nut 38 and plate member 22 in the direction of arrow 60 and rotating the opposite edge of the bar 46 into a plane for engagement with first lip means 20.

Referring now to FIG. 5, the structure of the mounting bracket will be described in greater detail. As there illustrated, the sectional view is along lines 5—5 of FIG. 1 and illustrates the transverse slot 42 which receives fasteners 40 which are machine bolts bearing a washer 41 and nut 43 to permit the fixed adjustability of lock plate 38 to the plate member 22 whereby the spaced-apart positions of first lip means 20 and second lip means 36 can be fixedly adjusted. The sectional view also illustrates the transverse slot 24 in the base member 12 which slidably receives bent tabs 26 and provides for limited, sliding travel of the plate assembly of plate member 22 and locking plate 38 in a direction normal to the first lip means 20.

The sectional view also illustrates the resilient means, compression spring 28 which is secured between spring retainers in the form of tab 32 and 34 which are carried, respectively, by base member 12 and the plate member 22.

The invention has been described with reference to the presently illustrated and preferred embodiment thereof. It is not intended that the invention be unduly limited by this disclosure of the presently preferred embodiment. Instead, it is intended that the invention be defined by the means, and their obvious equivalents, set forth in the following claims.

What is claimed is:

1. A universal mounting bracket, for the removable attachment of a radio and the like bearing a mounting bar bracket to a supporting structure, which comprises:
   a base member;
   tab support means laterally carried at opposite ends of said base member and bearing apertures for receiving fasteners to secure said base member to said supporting structure;
   first lip means extending longitudinally and substantially coextensively with one edge of said base member;
   mounting bracket retainer means carried on said base member;
   attachment means securing said retainer means to said base member including transverse slot means laterally spaced apart in said base member and first laterally spaced apart upright tab means carried by said retainer means and received in said slot means to permit a limited freedom of sliding movement of said retainer means relative to said base member in a direction normal to said first lip means;
   second lip means carried on said retainer means parallel to said first lip means; and
   second laterally spaced apart upright tab means carried by said base member in opposed alignment to said first upright tab means;
   resilient means retained between said first and second upright tab means and biasing said second lip means towards said first lip means whereby said mounting bar can be resiliently restrained therebetween.

2. The universal mounting bracket of claim 1 wherein said aperture means in said tab means comprises arcuate slots having a common radius whereby said mounting bracket can be angularly adjusted on said supporting structure.

3. The universal mounting bracket of claim 1 wherein said tab support means comprises end tabs bent laterally and upwardly, out of the plane of said base member.

4. The universal mounting bracket of claim 1 wherein said retainer means comprises a plate member with lock plate means fixedly adjustably carried on said plate member and bearing said second lip means.

5. The universal mounting bracket of claim 1 wherein said attachment means includes laterally spaced slots and bent tab retainer means cooperative therewith, each carried on respective plate and base members.

6. The universal mounting bracket of claim 4 wherein said lock plate means is secured to said plate member by slot means in one of said members and fasteners extending therebetween permitting the fixed adjustability of said lock plate means on said plate member.

7. The universal mounting bracket of claim 1 wherein said resilient means comprises compression spring means.

8. The universal mounting bracket of claim 7 wherein each said compression spring means is carried in respective slot means of said base member and is biased between opposed first and second upright tab means of said base and said plate members.

9. A universal mounting bracket, for the removable attachment of a radio and the like bearing a mounting bar bracket to a supporting structure, which comprises:
   a base member;
   tab support means laterally carried at opposite ends of said base member and bearing apertures for receiving fasteners to secure said base member to said supporting structure;
   first lip means extending longitudinally and substantially coextensively with one edge of said base member;
   first and second transverse slots laterally spaced apart on said base member;
   mounting bracket retainer means comprising a plate member slidably carried on said base member with laterally space apart first upright tab means, one each received within each of said transverse slots;

a plurality of laterally spaced apart slots in said base member and an equal plurality of laterally spaced apart bent tabs, one each received with a respective one of said slots to slidably secure said plate member to said base member;

a lock plate secured to said plate member by transverse slots in said plate member and fasteners carried by said lock plate and received within said transverse slots to permit the fixed adjustability in spacing of said lock plate and receive within said transverse slots to permit the fixed adjustability in spacing of said lock plate on said plate member;

second lip means carried by said lock plate parallel and opposed to said first lip means;

second laterally spaced upright tab means carried by said base member in opposed alignment to said first upright tab means;

compression spring means received within respective slot means and retained between respective, opposed first and second upright tab means biasing said second lip means towards said first lip means whereby said mouting bar can be resiliently restrained therebetween.

* * * * *